United States Patent
Chen

(10) Patent No.: US 9,469,367 B2
(45) Date of Patent: Oct. 18, 2016

(54) HANDLEBAR END CAPS FOR BICYCLE

(71) Applicant: Chih-Hsien Chen, Taichung (TW)

(72) Inventor: Chih-Hsien Chen, Taichung (TW)

(*) Notice: Subject to any disclaimer, the term of this patent is extended or adjusted under 35 U.S.C. 154(b) by 0 days.

(21) Appl. No.: 14/876,865

(22) Filed: Oct. 7, 2015

(65) Prior Publication Data

US 2016/0107717 A1    Apr. 21, 2016

(30) Foreign Application Priority Data

Oct. 17, 2014  (TW) .............................. 103218530 U

(51) Int. Cl.
*B62K 21/12*    (2006.01)

(52) U.S. Cl.
CPC .................................... *B62K 21/12* (2013.01)

(58) Field of Classification Search
CPC ...... B62K 21/12; B62K 21/18; B62K 21/24; B62K 21/26; Y10T 74/2078; Y10T 74/20822; Y10T 74/20828
See application file for complete search history.

(56) References Cited

U.S. PATENT DOCUMENTS

| | | | | |
|---|---|---|---|---|
| 6,263,759 B1* | 7/2001 | Hollingsworth | ....... | B62K 21/26 74/551.9 |
| 6,615,687 B2* | 9/2003 | Bendetti | ................ | B62K 21/26 74/551.8 |
| 7,731,445 B2* | 6/2010 | Coaplen | ................ | B62K 21/06 280/279 |
| 7,815,206 B2* | 10/2010 | Tseng | ..................... | B62K 21/18 280/279 |
| 7,942,077 B2* | 5/2011 | Lai | ......................... | B62K 21/26 16/421 |
| 8,365,635 B2 | 2/2013 | Grimes | | |
| 2012/0222265 A1* | 9/2012 | Chen | ..................... | B62K 11/14 16/2.2 |

* cited by examiner

*Primary Examiner* — Adam D Rogers
(74) *Attorney, Agent, or Firm* — Alan D. Kamrath; Kamrath IP Lawfirm, P.A.

(57) ABSTRACT

A handlebar end cap for a bicycle contains: a body, a retaining member, and a cover. The body includes a hole, at least one end face, and a fixing groove with a second inner diameter. The hole has a first inner diameter, and the body further includes a slot. The retaining member includes a recess and a first outer diameter, the first outer diameter has a circular locking loop, and the locking loop has a second outer diameter. The retaining member further includes a positioning rib and a limiting notch, the positioning rib has a third inner diameter, and the limiting notch has a fourth inner diameter. The cover includes a covering face, and the cover includes a first locating trench and a defining portion. The first locating trench has a third outer diameter, and the defining portion has a fourth outer diameter.

5 Claims, 8 Drawing Sheets

HANDLEBAR END CAPS FOR BICYCLE

BACKGROUND OF THE INVENTION

1. Field of the Invention

The present invention relates to a distal end of a tube for fitness equipment and, more particularly, to a handlebar end cap which is adapted to close a hole on the distal end of the tube for the fitness equipment.

2. Description of the Prior Art

A conventional handlebar end cap is made of plastic material and is employed to close a handlebar or a hole on a seat tube for a bicycle. However, the cover is flexible and is connected with the handlebar or the seat tube, so it removes from the handlebar or the seat tube easily and cannot replace a metal end cap.

To overcome such a defect, a handlebar end cap is disclosed in U.S. Pat. No. 8,365,635 and is coupled with a metal handlebar by using a plastic member. However, it still has the following defects;

1. When the metal handlebar is in connection with the handlebar end cap by ways of the plastic member, the end cap is forced to couple with the metal handlebar. If desiring to replace a protective sleeve of the handlebar or the end cap, the plastic member is broken to replace the protective sleeve or the handlebar end cap, so the plastic member cannot be used repeatedly. If there is no spare handlebar end cap, the protective sleeve of the handlebar or the end cap cannot be replaced.

2. After the handlebar and the handlebar end cap are connected together by ways of the plastic member, the plastic member exposes outside to reduce the aesthetics appearance.

The present invention has arisen to mitigate and/or obviate the afore-described disadvantages.

SUMMARY OF THE INVENTION

The primary objective of the present invention is to provide a handlebar end cap for a bicycle which contains a body and a cover which are connected together by using a retaining member made of plastic material. The retaining member has a recess, so that the retaining member expands and retracts by using the recess, a locking loop, a positioning rib, a first locating trench, a limiting notch, and a defining portion. Hence, the cover covers a hole of the body tightly and is replaced easily.

Another objective of the present invention is to provide a handlebar end cap for a bicycle which after the body and the cover made of metal material are connected together by using the retaining member made of plastic material, the retaining member is housed between the body and the cover to enhance the aesthetics appearance.

To obtain above-mentioned objectives, a handlebar end cap for a bicycle provided by the present invention contains a body, a retaining member, and a cover.

The body includes a hole having a first inner diameter and at least one end face. The hole also has a fixing groove defined on an inner wall thereof adjacent to the end face, and the fixing groove has a second inner diameter. The body includes a slot formed on one side thereof.

The retaining member is formed in a circular ring shape and includes a recess defined thereon, so that the retaining member is retracted and expanded flexibly by using the recess. The retaining member includes a first outer diameter configured on an outer rim thereof and smaller than the first inner diameter. The first outer diameter of the retaining member has a circular locking loop arranged on a first end thereof, and the locking loop has a second outer diameter greater than the first inner diameter. The retaining member further includes a positioning rib defined on a second end thereof, and the positioning rib has a third inner diameter. The retaining member further includes a limiting notch having a fourth inner diameter greater than the third inner diameter.

The cover includes a covering face defined on a first end thereof and of a size greater than the end face, and the cover includes a first locating trench extending around a second end thereof. The cover further includes a defining portion extending outwardly from the first locating trench. The first locating trench has a third outer diameter. The defining portion has a fourth outer diameter smaller than the fourth inner diameter and greater than the third inner diameter, and the third inner diameter is greater than the third outer diameter.

The recess of the retaining member expands outwardly, so that the third inner diameter is greater than the fourth outer diameter, the positioning rib fits with the first locating trench via the defining portion, and the defining portion fits with the limiting notch. When the retaining member retracts by pressing the recess, the second outer diameter is smaller than the first inner diameter, so that the locking loop fits with the fixing groove through the hole.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
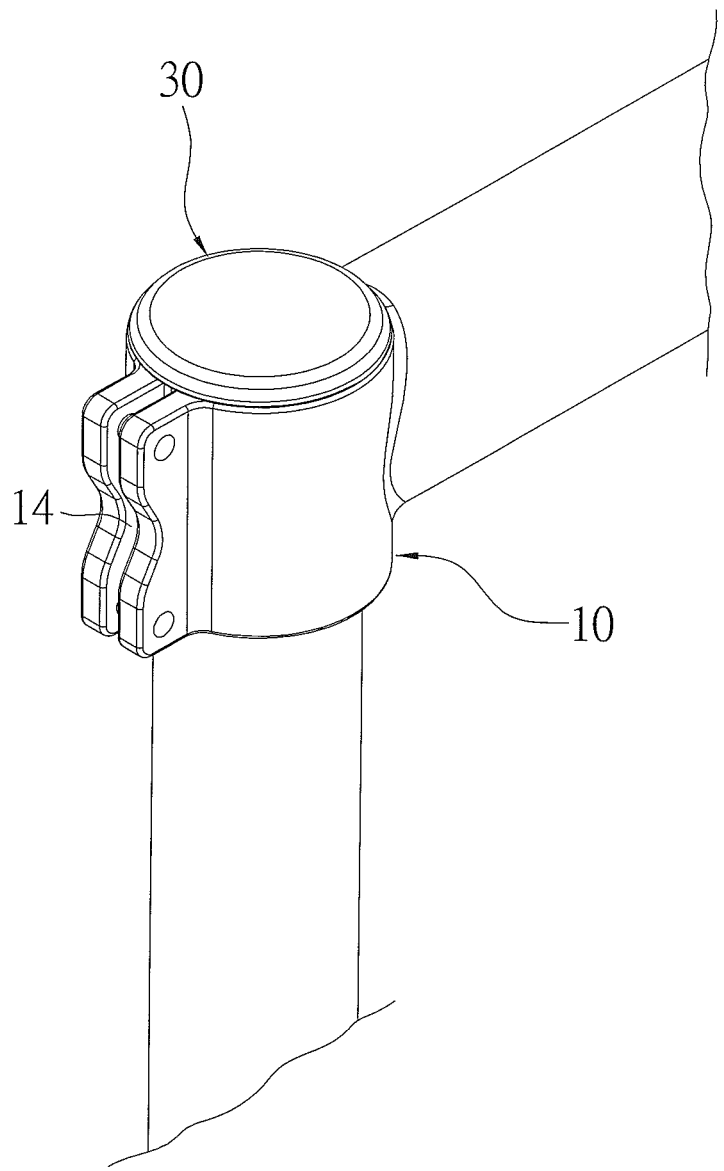
FIG. 1 is a perspective view showing the assembly of a handlebar end cap for a bicycle according to a preferred embodiment of the present invention.
Figure 2:
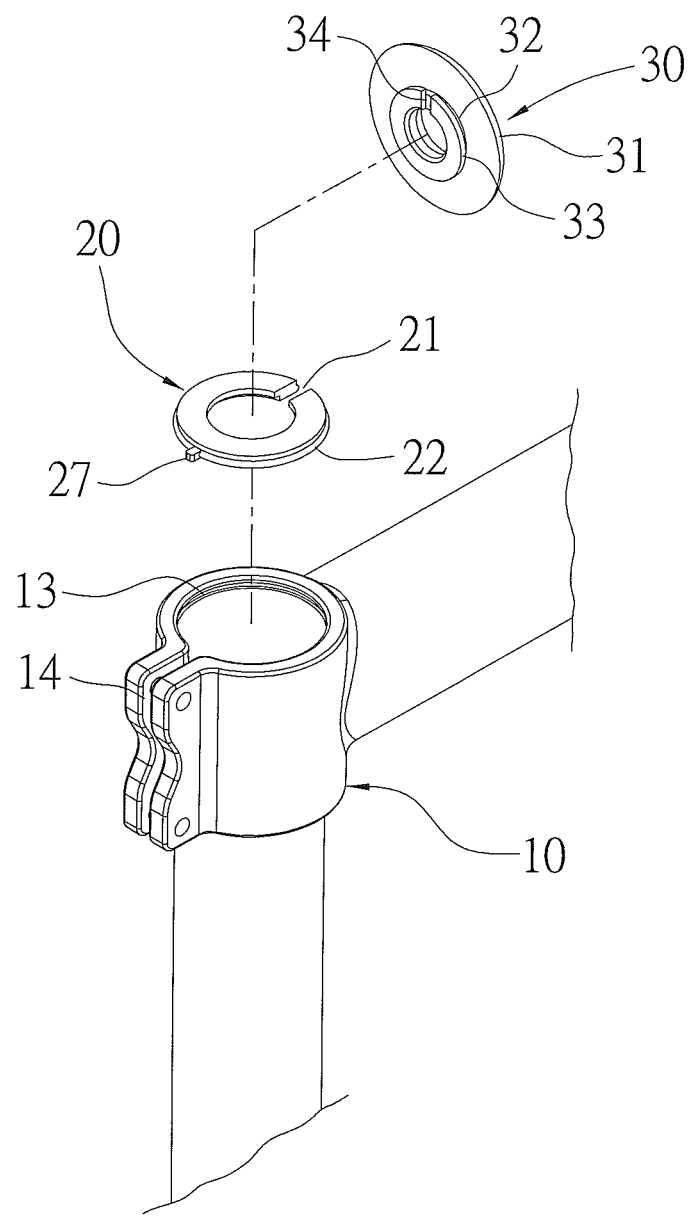
FIG. 2 is a perspective view showing the exploded components of the handlebar end cap for the bicycle according to the preferred embodiment of the present invention.
Figure 3:
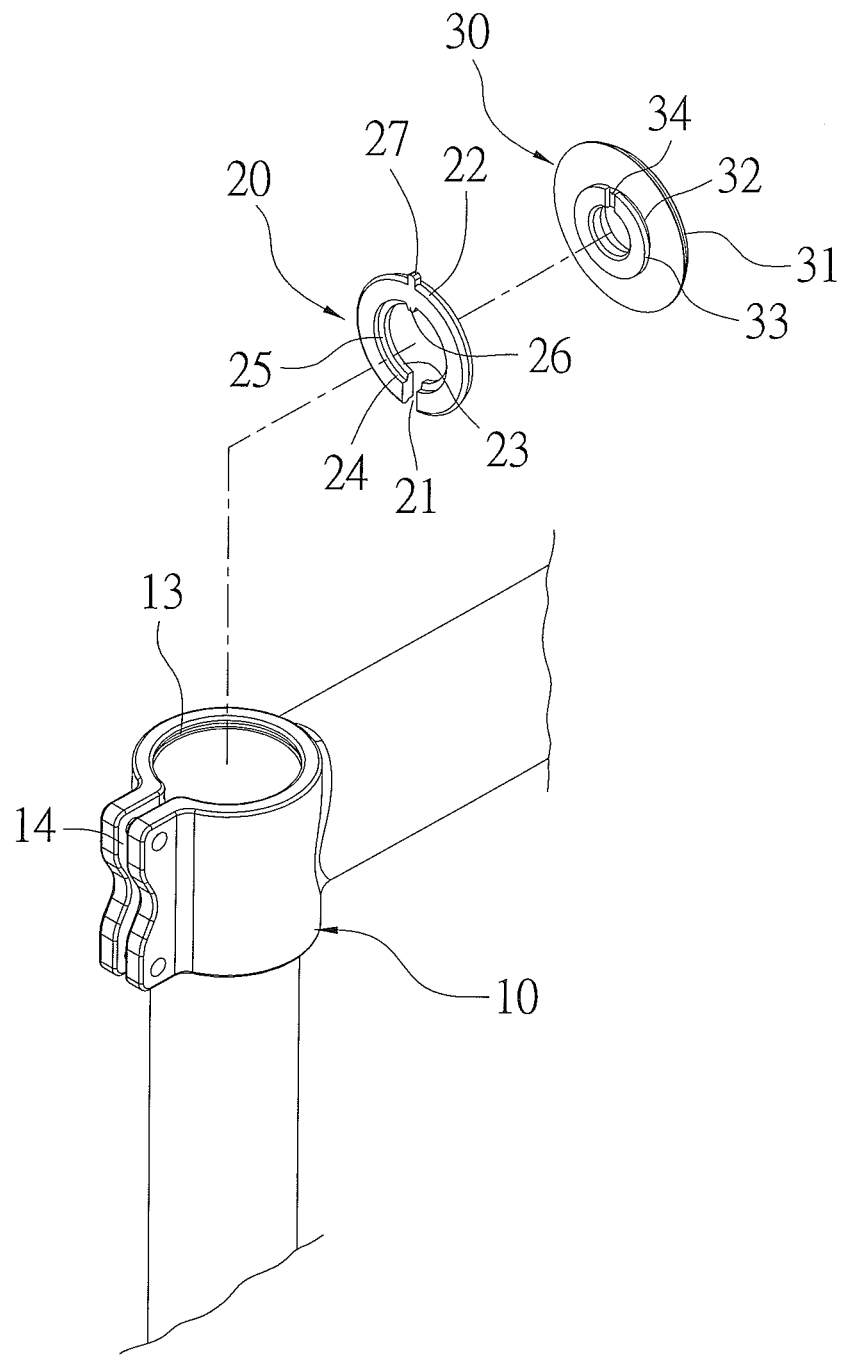
FIG. 3 is another perspective view showing the exploded components of the handlebar end cap for the bicycle according to the preferred embodiment of the present invention.
Figure 4:
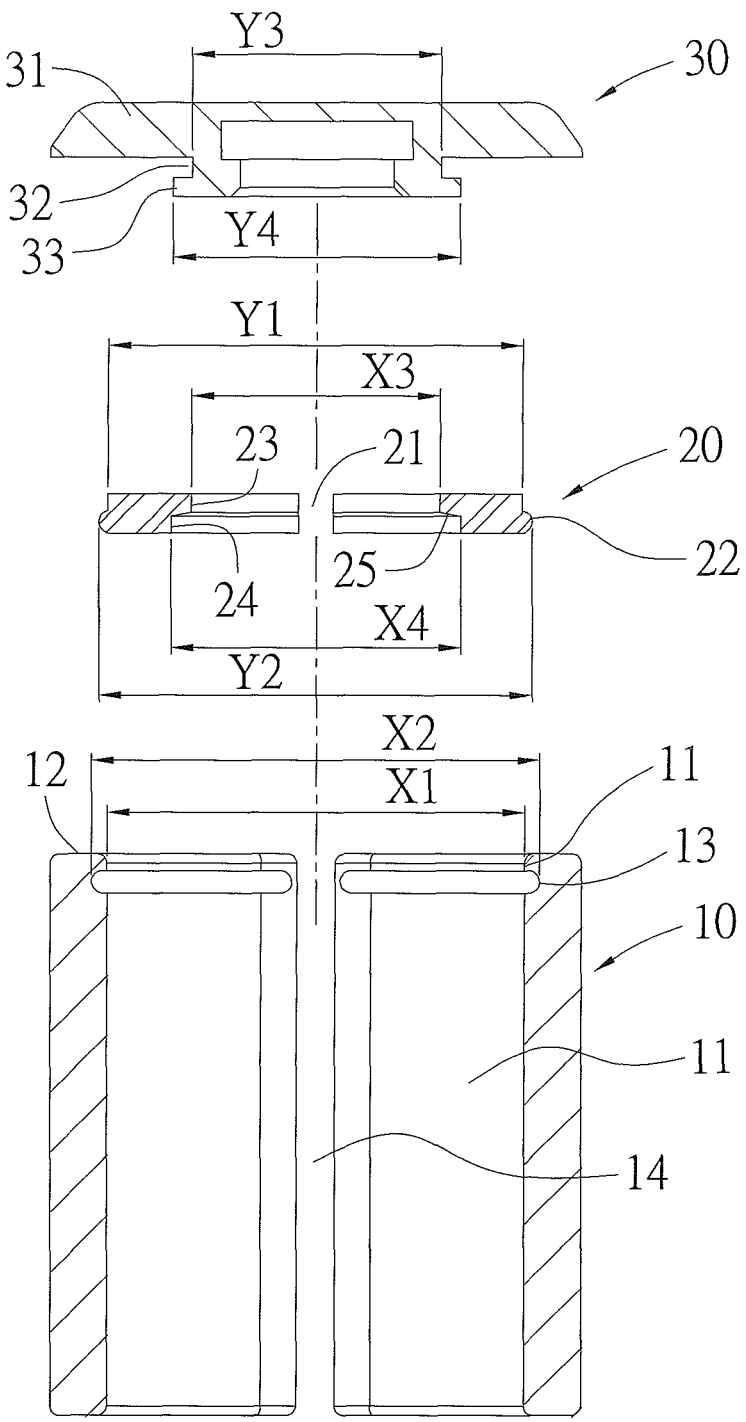
FIG. 4 is a cross sectional view showing the exploded components of the handlebar end cap for the bicycle according to the preferred embodiment of the present invention.

With reference to FIGS. 1 to 3, a handlebar end cap for a bicycle according to a preferred embodiment of the present invention comprises: a body 10, a retaining member 20, and a cover 30.

The body 10 includes a hole 11 having a first inner diameter X1 and at least one end face 12. The hole 11 also has a fixing groove 13 defined on an inner wall thereof adjacent to the end face 12, and the fixing groove 13 has a second inner diameter X2. The body 10 includes a slot 14 formed on one side thereof and passing through the hole 11, the end face 12 and the fixing groove 13, and the body 10 is made of any metal material.

The retaining member 20 is formed in a circular ring shape and includes a recess 21 defined thereon, so that the retaining member 20 is retracted and expanded flexibly by using the recess 21. The retaining member 20 includes a first outer diameter Y1 configured on an outer rim thereof and smaller than the first inner diameter X1. The first outer diameter Y1 of the retaining member 20 has a circular locking loop 22 arranged on a first end thereof, and the locking loop 22 has a second outer diameter Y2 greater than the first inner diameter X1. The retaining member 20 further includes a positioning rib 23 defined on a second end thereof, and the positioning rib 23 has a third inner diameter X3. The retaining member 20 further includes a limiting notch 24 having a fourth inner diameter X4 greater than the third inner diameter X3. The positioning rib 23 has a tilted pushing face 25 formed between the positioning rib 23 and the limiting notch 24. The retaining member 20 further includes a first affix rib 26 formed on an inner rim thereof and a second affix rib 27 configured on the outer rim thereof. The retaining member 20 is made of plastic material.

The cover 30 includes a covering face 31 defined on a first end thereof and of a size greater than the end face 12. The cover 30 includes a first locating trench 32 extending around a second end thereof, and the cover 30 further includes a defining portion 33 extending outwardly from the first locating trench 32. The first locating trench 32 has a third outer diameter Y3. The defining portion 33 has a fourth outer diameter Y4 smaller than the fourth inner diameter X4 and greater than the third inner diameter X3, and the third inner diameter X3 is greater than the third outer diameter Y3. The defining portion 33 has a second locating trench 34, and the cover 30 is made of plastic material or metal material.

Figure 5:
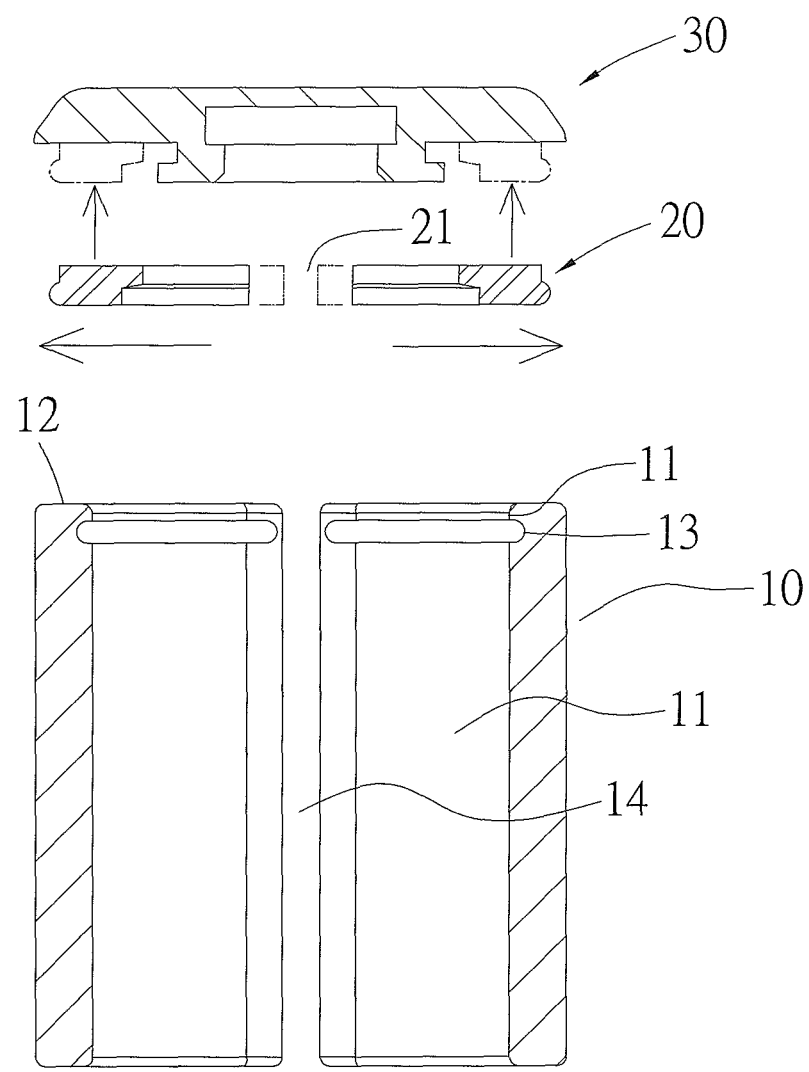
FIG. 5 is a cross sectional view showing the operation of a retaining member and a cover of the handlebar end cap for the bicycle according to the preferred embodiment of the present invention.
Figure 6:
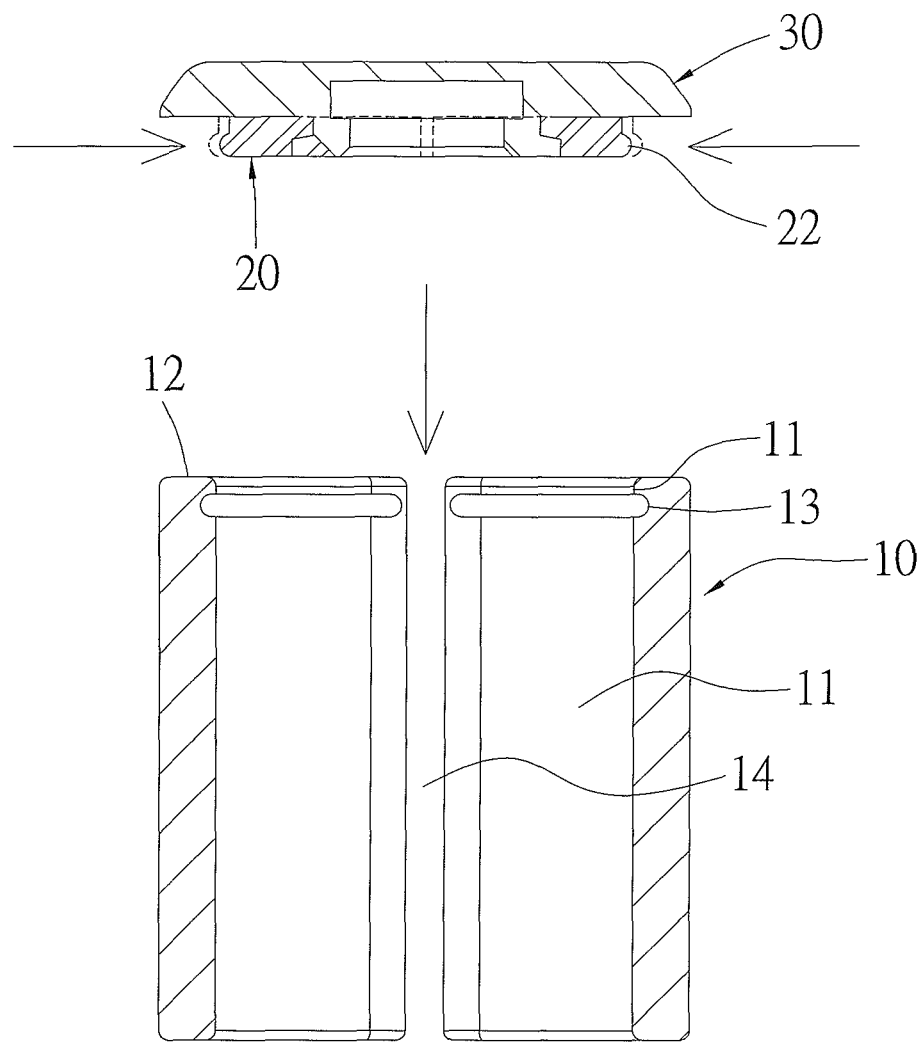
FIG. 6 is a cross sectional view showing the operation of the retaining member, the cover and a body of the handlebar end cap for the bicycle according to the preferred embodiment of the present invention.
Figure 7:
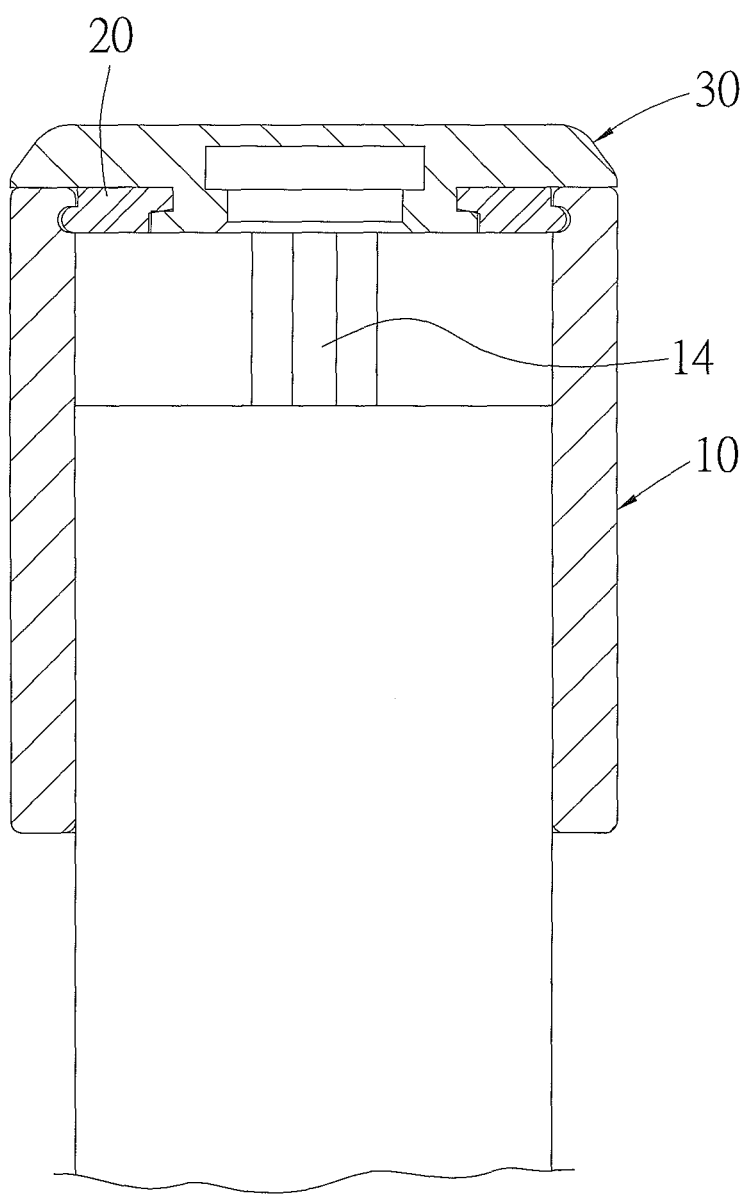
FIG. 7 is a cross sectional view showing the assembly of the handlebar end cap for the bicycle according to the preferred embodiment of the present invention.
Figure 8:
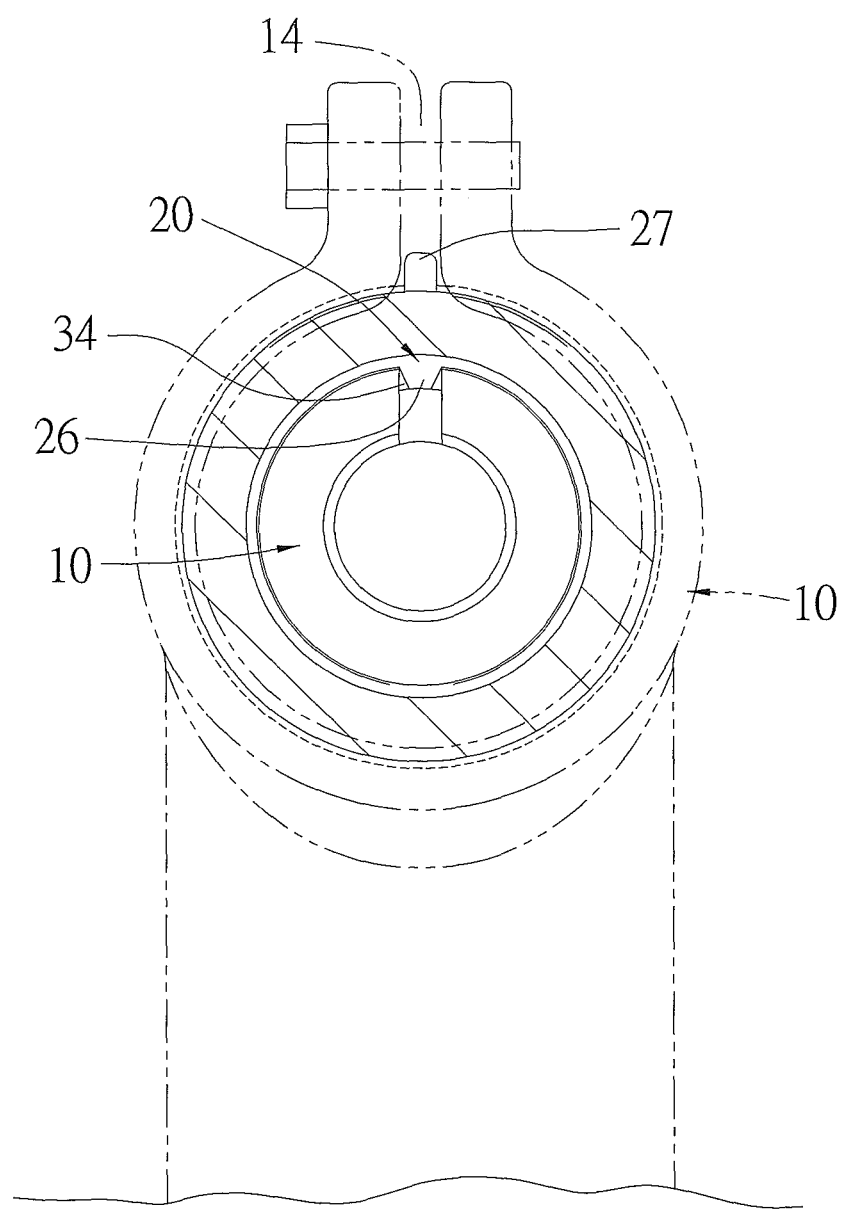
FIG. 8 is another cross sectional view showing the assembly of the handlebar end cap for the bicycle according to the preferred embodiment of the present invention.

Referring to FIGS. 5 and 6, in assembly, the recess 21 of the retaining member 20 expands outwardly, so that the third inner diameter X3 is greater than the fourth outer diameter Y4, the positioning rib 23 fits with the first locating trench 32 via the defining portion 33, and the defining portion 33 fits with the limiting notch 24. Referring further to FIGS. 6 and 7, when the retaining member 20 retracts by pressing the recess 21, the second outer diameter Y2 is smaller than the first inner diameter X1, so that the locking loop 22 fits with the fixing groove 13 through the hole 11, and the first affix rib 26 retains in the second locating trench 34. Hence, an anti-rotating limitation forms between the retaining member 20 and the cover 30, and the second affix rib 27 retains in the slot 14 to obtain an anti-rotating limitation between the body 10 and the retaining member 20, as shown in FIG. 8.

When the limiting notch 24 of the retaining member 20 fits with the defining portion 33 of the cover 30, the tilted pushing face 25 abuts the defining portion 33, so that the retaining member 20 deforms. It is to be noted that the larger the deformation is, the larger force has to be exerted, thus avoiding a deformable removal.

The handlebar end cap of the present invention has advantages as follows:

The body 10 and the cover 30 are connected together by ways of the retaining member 20 made of plastic material, and the retaining member 20 has the recess 21. Thus, the retaining member 20 expands and retracts by using the recess 21, and the cover 30 closes the hole 11 of the body 10 by the fixing groove 13, the locking loop 22, the positioning rib 23, the first locating trench 32, the limiting notch 24, and the defining portion 33. Thereby, the cover 30 covers the hole 11 of the body 10 tightly and is replaced easily.

After the body 10 and the cover 30 made of metal material are connected together by using the retaining member 20 made of plastic material, the retaining member 20 is housed between the body 10 and the cover 30 to enhance the aesthetics appearance.

While various embodiments in accordance with the present invention have been shown and described, it is clear to those skilled in the art that further embodiments may be made without departing from the scope of the present invention.

What is claimed is:

1. A handlebar end cap for a bicycle comprising:
a body including a hole having a first inner diameter and an end face, with the hole also having a fixing groove defined on an inner wall thereof adjacent to the end face, with the fixing groove having a second inner diameter, with the body including a slot formed on one side thereof;
a retaining member formed in a circular ring shape and including a recess defined thereon so that the retaining member is retracted and expanded flexibly by using the recess, with the retaining member including a first outer diameter configured on an outer rim thereof and smaller than the first inner diameter, with the first outer diameter of the retaining member having a circular locking loop arranged on a first end thereof, with the locking loop having a second outer diameter greater than the first inner diameter, with the retaining member further including a positioning rib defined on a second end thereof, with the positioning rib having a third inner diameter, the retaining member further including a limiting notch having a fourth inner diameter greater than the third inner diameter;
a cover including a covering face defined on a first end thereof and of a size greater than the end face, with the cover including a first locating trench extending around a second end thereof, with the cover further including a defining portion extending outwardly from the first locating trench, wherein the first locating trench has a third outer diameter, wherein the defining portion has a fourth outer diameter smaller than the fourth inner diameter and greater than the third inner diameter, and wherein the third inner diameter is greater than the third outer diameter;
wherein the recess of the retaining member expands outwardly so that the third inner diameter is greater than the fourth outer diameter, the positioning rib fits with the first locating trench via the defining portion, and the defining portion fits with the limiting notch, and when the retaining member retracts by pressing the recess, the second outer diameter is smaller than the first inner diameter so that the locking loop fits with the fixing groove through the hole.

2. The handlebar end cap for the bicycle as claimed in claim 1, wherein the positioning rib of the retaining member has a tilted pushing face formed between the positioning rib and the limiting notch.

3. The handlebar end cap for the bicycle as claimed in claim 1, wherein the body is made of metal material, the retaining member is made of plastic material, and the cover is made of plastic material or metal material.

4. The handlebar end cap for the bicycle as claimed in claim 1, wherein the retaining member further includes a first affix rib formed on an inner rim thereof, the first affix rib retains in a second locating trench, and an anti-rotating limitation forms between the retaining member and the cover.

5. The handlebar end cap for the bicycle as claimed in claim 4, wherein the retaining member further includes a second affix rib configured on the outer rim thereof, and the second affix rib retains in the slot to obtain an anti-rotating limitation between the body and the retaining member.

* * * * *